United States Patent [19]

Yuzuriha et al.

[11] Patent Number: 4,998,999
[45] Date of Patent: Mar. 12, 1991

[54] STEERING COLUMN ASSEMBLY WITH ENERGY ABSORPTION MECHANISM

[75] Inventors: Naoki Yuzuriha, Kanagawa; Yoshimi Yamamoto, Shizuoka, both of Japan

[73] Assignees: Nissan Motor Company, Limited, Yokohama; Fuji Kiko Company, Tokyo, both of Japan

[21] Appl. No.: 384,702

[22] Filed: Jul. 25, 1989

[30] Foreign Application Priority Data

Jul. 25, 1988 [JP] Japan .............................. 63-98141[U]

[51] Int. Cl.$^5$ .......................... B62D 1/18; B62D 1/19
[52] U.S. Cl. .................................. 280/777; 280/780; 74/492
[58] Field of Search ...................... 280/777, 779, 780; 74/492

[56] References Cited

U.S. PATENT DOCUMENTS

| 3,470,761 | 10/1969 | Okamoto et al. | 280/777 |
| 3,492,888 | 2/1970 | Nishimura et al. | 280/777 |
| 3,944,244 | 3/1976 | Albrecht | 280/777 |
| 4,000,876 | 1/1977 | Usui et al. | 280/780 |
| 4,102,217 | 7/1978 | Yamamoto et al. | 280/777 |
| 4,228,695 | 10/1980 | Trevisson et al. | 280/777 |
| 4,616,522 | 10/1986 | White et al. | 74/492 |
| 4,703,669 | 11/1987 | Hyodo | 74/492 |
| 4,786,076 | 11/1988 | Wierschem | 280/777 |
| 4,838,576 | 6/1989 | Hamasaki et al. | 74/492 |

FOREIGN PATENT DOCUMENTS

| 29757 | 6/1981 | European Pat. Off. | 280/777 |
| 2054116 | 5/1972 | Fed. Rep. of Germany | 280/277 |
| 2236136 | 2/1973 | Fed. Rep. of Germany | 280/777 |

Primary Examiner—Richard A. Bertsch
Assistant Examiner—Tamara L. Finlay
Attorney, Agent, or Firm—Foley & Lardner, Schwartz, Jeffery, Schwaab, Mack, Blumenthal & Evans

[57] ABSTRACT

A steering column assembly includes a steering column having an upper steering column tube and a lower steering column tube which are telescopically connected at their lower and upper portions respectively, a stationary bracket fixed to a vehicle body and an energy absorption bracket fixed to the stationary bracket. The energy absorption bracket fixedly receives the upper steering column tube which extends therethrough. The energy absorption bracket gets plastically deformed in response to an impact load exceeding a predetermined value to allow the upper steering column tube to displace downward with respect to the lower steering column tube. The impact load is applied to the energy absorption bracket through the upper steering column tube in the direction along the axis of the steering column. The applied impact load is absorbed through the plastic deformation of the energy absorption bracket.

12 Claims, 4 Drawing Sheets

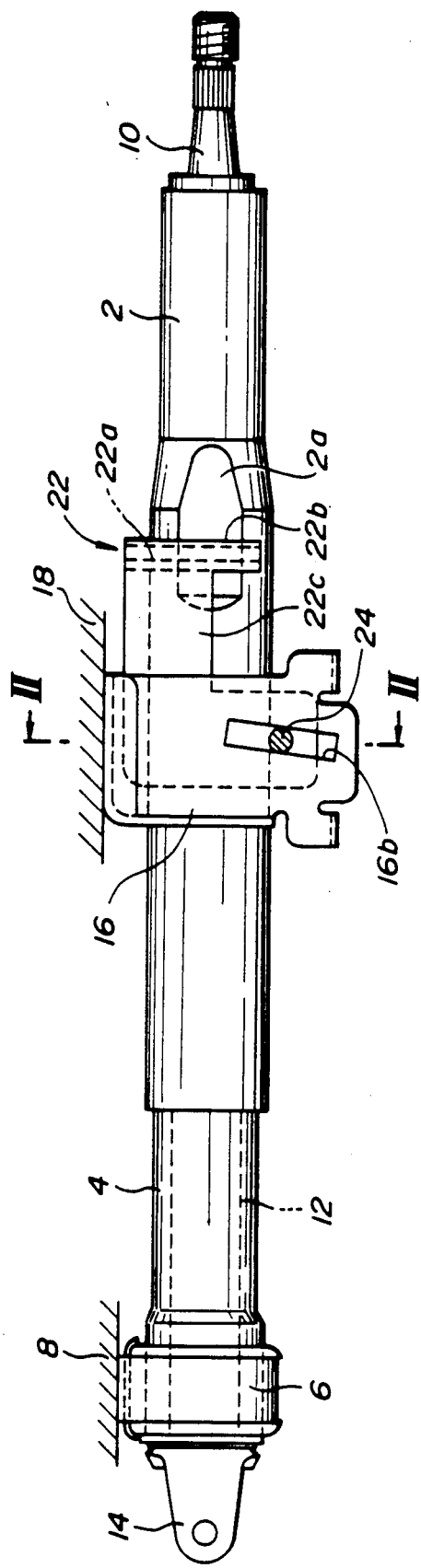
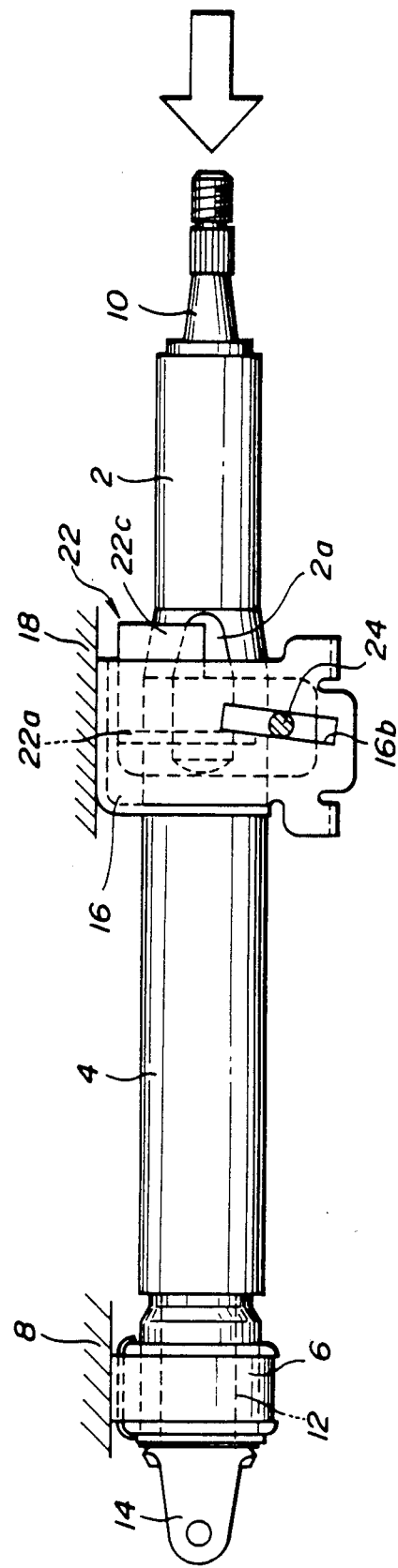

STEERING COLUMN ASSEMBLY WITH ENERGY ABSORPTION MECHANISM

BACKGROUND OF THE INVENTION

1. Field of the Invention

The present invention relates generally to a steering column assembly having an energy absorption mechanism. More specifically, the present invention relates to an automotive steering column assembly having an energy absorption mechanism, which effectively absorbs impact load applied to a steering column by a driver's secondary collision when a motor vehicle accident occurs.

2. Description of the Background Art

There have been various types of safety systems for the automotive steering column assembly, wherein the energy applied to the steering column by the driver's secondary collision is absorbed so as to protect the driver.

In one type of safty system, an upper steering column tube is allowed to displace relative to a lower steering column tube so as to absorb the impact load applied by the driver's secondary collision. Specifically, the upper and lower column tubes are telescopically connected at their end portions such that when the impact force applied to the upper steering column tube in the direction of the axis of the steering column is larger than a predetermined value, the upper steering column tube is allowed to move relative to the lower steering column tube, either accommodating the lower steering column tube thereinto or telescoping into the lower steering column tube.

In the prior art structure, however, since the energy absorption mechanism should be provided between the upper and lower steering column tubes and/or between upper and lower steering shafts, it is inevitably complicated in structure and difficult to provide such an energy absorption mechanism which is capable of absorbing a sufficient amount of the applied energy per se.

SUMMARY OF THE INVENTION

Therefore, it is an object of the present invention to provide a steering column assembly which is capable of effectively absorbing impact energy applied to a steering column with simple structure.

Another object of the present invention is to provide a steering column assembly which is capable of effectively absorbing applied energy without using the energy absorption mechanism as in the prior art which is capable of absorbing a sufficient amount of the applied energy per se and which is provided between upper and lower steering column tubes and/or between upper and lower steering shafts.

A further object of the present invention is to provide a steering column assembly which is capable of effectively absorbing applied energy using plastic deformation of energy absorption means provided between an upper steering column tube and a vehicle body.

To accomplish the above-mentioned and other objects, according to one aspect of the present invention, a steering column assembly comprises a steering column having an upper steering column tube and a lower steering column tube which are telescopically connected at their lower and upper portions respectively, energy absorption means fixed to a vehicle body, the energy absorption means fixedly receiving the upper steering column tube for becoming plastically deformed in response to an impact load exceeding a predetermined value to allow the upper steering column tube to displace downwardly with respect to the lower steering column tube. The impact load is applied to the energy absorption means through the upper steering column tube in the direction along the axis of the steering column.

According to another aspect of the present invention, a steering column assembly comprises a steering column having an upper steering column tube and a lower steering column tube which are telescopically connected at their lower and upper portions respectively. The steering column rotatably receives an upper steering shaft and a lower steering sleeve which are telescopically connected at their lower and upper portions respectively. The steering column assembly further comprises a stationary bracket fixed to a vehicle body and an energy absorption bracket fixed to the stationary bracket. The energy absorption bracket fixedly receives the upper steering column tube which extends therethrough, and the energy absorption bracket plastically deforms in response to an impact load exceeding a predetermined value to allow the upper steering column tube and the upper steering shaft to displace downward with respect to the lower steering column tube and the lower steering sleeve respectively. The impact load is applied to the energy absorption bracket through the upper steering column tube in the direction along the axis of the steering column.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 1 is a side elevation showing a tilt-angle adjustable steering column assembly provided with an energy absorption mechanism according to a preferred embodiment of the present invention;

FIG. 4 is a side elevation showing the steering column assembly of FIG. 1, wherein the energy absorption member of FIG. 3 is fully deformed.

DESCRIPTION OF THE PREFERRED EMBODIMENT

Figure 2:
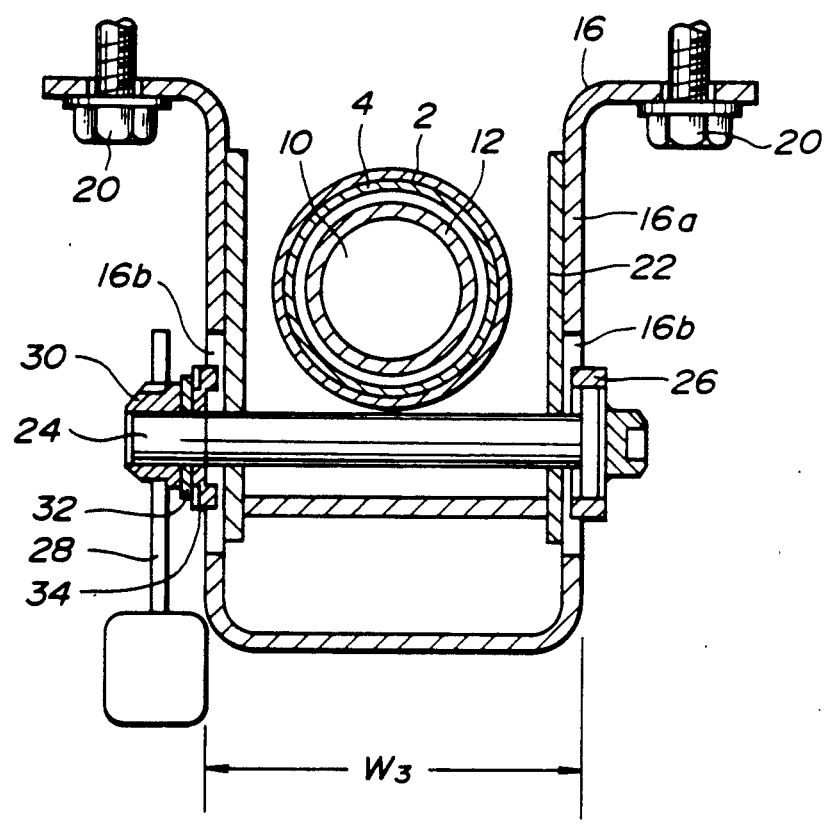
FIG. 2 is a sectional view taken along the line II—II of FIG. 1.

Referring now to the drawings, a preferred embodiment of a steering column assembly according to the present invention will be described.

In FIGS. 1 and 2, a steering column comprises an upper steering column tube 2 and a lower steering column tube 4. Specifically, the upper steering column tube 2 telescopically receives an upper portion of the lower steering column tube 4 in the known way such that the upper steering column tube 2 is allowed to displace downwardly relative to the lower steering column tube 4 when a force exceeding a set value is applied to the upper steering column tube 2 in the direction of the axis of the upper steering column tube 2. It is to be appreciated that the set value is very small as opposed to the prior art, which is required only for an assembling purpose.

An upper steering shaft 10 is rotatably received in the upper steering column tube 2 through a bearing provided at the upper end of the upper steering column tube 2 remote from the lower steering column tube 4. The upper steering shaft 10 is joined to a steering wheel (not shown) at its upper end (at the rightmost in FIG. 1). A lower steering sleeve 12 is rotatably received in the lower steering column tube 4 through a bearing provided at the lower end of the lower steering column tube 4 and connected at its lower end to a steering mechanism (not shown) through a universal joint 14. The lower steering sleeve 12 is pivotable through the universal joint 14 for a tilt-angle adjustment purpose which will be described later. The lower steering column tube 4 is movable in synchronism with the pivoted movement of the lower steering shaft 12 also for the tilt-angle adjustment purpose. A dash bracket 6 is fixed to a dash panel 8 for protecting the lower end portion of the lower steering column tube 4.

The upper steering shaft 10 is telescopically received in the lower steering sleeve 12 in the known way. Specifically, the upper steering shaft 10 and the lower steering sleeve 12 are connected in such a fashion as to ensure the torque transmission from the upper steering shaft 10 to the lower steering sleeve 12 and to prevent the relative displacement therebetween in the direction of the axis thereof by means of shear pins which are formed of synthetic resin. The sheer pins are sheared when a force exceeding a set value is applied thereto in the direction of the axis of the steering column. It is also to be appreciated that the set value is very small as opposed to the prior art, which is required only for an assembling purpose.

A stationary bracket 16 is firmly secured to an instrument panel 18 of the vehicle body by means of bolts 20 as clearly seen in FIG. 2. The stationary bracket 16 is generally of a channel-shape having a U-shape in section and receives therein an energy absorption bracket 22.

Figure 3:
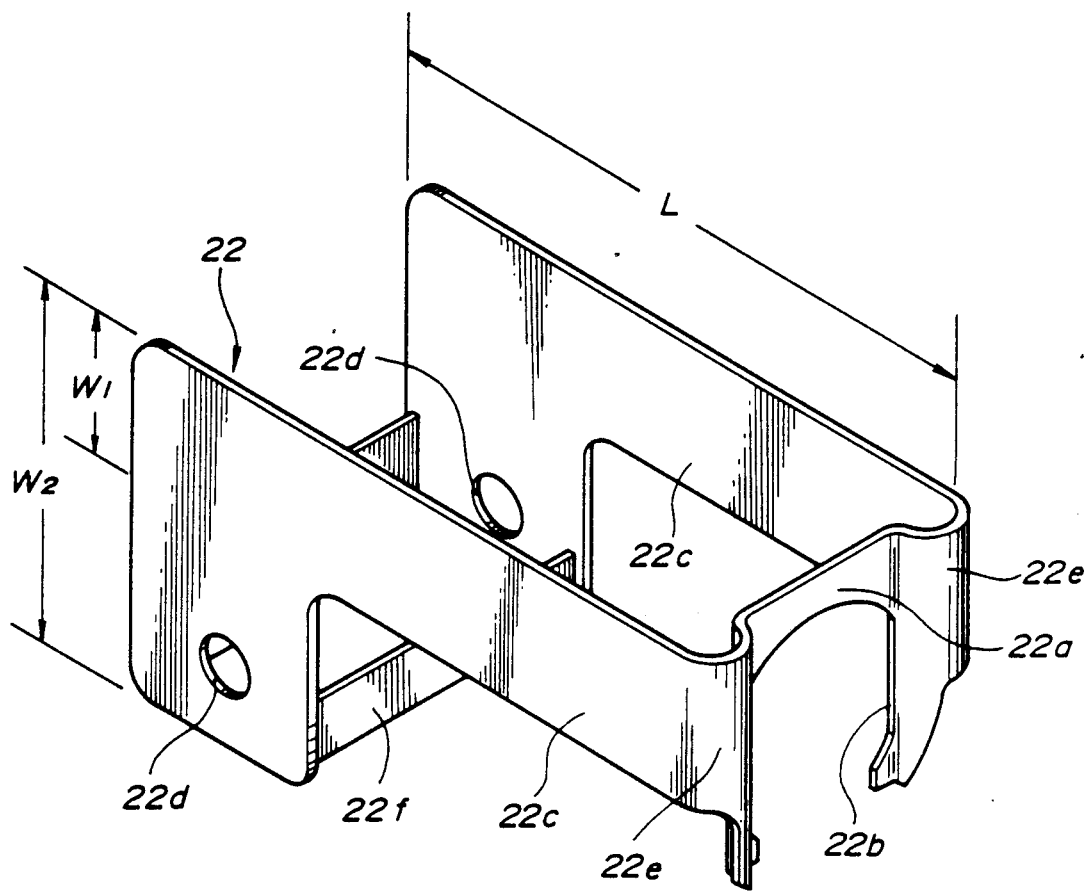
FIG. 3 is a perspective view showing an energy absorption member as used in the preferred embodiment of FIG. 1.

As seen from FIG. 3, the energy absorption bracket 22 includes a front wall 22a facing the steering wheel, i.e. substantially perpendicular to the axis of the steering column, an upper steering column tube mounting section 22b defining a space for receiving the upper steering column tube 2, a pair of side walls 22c, 22c each of which is generally of a key-shape having a relatively long portion of a smaller width W1 and a relatively short portion of a larger width W2 and each of which is formed with a through hole 22d at its larger diameter portion and extends along the axis of the steering column, and a pair of curved sections 22e, 22e each having a predetermined radius of curvature and connecting the side wall 22c to the front wall 22a. A reinforcing member 22f may be provided between the side walls 22c so as to reinforce the structure. A length L of each side wall 22c is preferably not less than about 1.5 to 2 times of a width W3 of the stationary bracket 16. The energy absorption bracket 22 is formed of plastically deformable material having a predetermined flexural rigidity.

The upper steering column tube 2 is received in the space defined by the mounting section 22b and is firmly welded to the mounting section 22b. The upper steering column tube 2 is formed with a pair of mounting portions 2a, 2a which are arranged in diametrically opposite locations. The mounting portions 2a, 2a are provided for making the upper steering column tube 2 match the contour of the mounting section 22b.

As seen from FIG. 2, the energy absorption bracket 22 is arranged between side walls 16a, 16a of the stationary bracket 16 by means of a fastening bolt 24 which is inserted through a pair of elongate apertures 16b, 16b formed in the stationary bracket 16 and through a pair of the through holes 22d of the energy absorption bracket 22. The fastening bolt 24 has its head formed with an engaging portion which is fitted into the elongate aperture 16b so as to prevent the fastening bolt 24 from rotating relative to the stationary bracket 16. A tilt-angle adjusting lever 28 is integral with a fastening nut 30 which is screwed onto one end of the fastening bolt 24 remote from its head 26 for firmly supporting the steering column at a desired selective position within a range of the elongate apertures 16b, 16b. A washer 32 and a guide member 34 are provided between the side wall 16a of the stationary bracket 16 and the fastening nut 30. The guide member has an engaging portion which is fitted into the elongate aperture 16b. When the tilt-angle adjusting lever 28 is actuated to loosen the fastening nut 30, the guide member 34 works to guide the fastening bolt 24 along its engaging portion in cooperation with the fastening bolt head 26.

Now the operation of the steering column assembly of this embodiment will be described hereinbelow.

When the impact load is applied to the steering wheel in the direction along the axis of the steering column by the driver's secondary collision, the impact load is transmitted to the upper steering column tube 2 through the upper steering shaft 10 or directly from the steering wheel after the upper steering shaft 10 has performed a downward displacement to some extent with respect to the lower steering sleeve 12. The applied load is then transmitted to the energy absorption bracket 22. When the applied load is larger than a predetermined value, the energy absorption bracket 22 is plastically deformed to absorb the applied load and to allow the downward displacement of the upper steering column tube 2 relative to the lower steering column tube 4 to protect the driver as shown in FIG. 4. Specifically, when the impact load applied to the upper steering column tube 2 forces the upper steering column tube 2 along with the energy absorption bracket 22 to move downward, since the energy absorption bracket 22 is fixed to the stationary bracket 16 by means of the fastening bolt 24, the side walls 22c of the energy absorption bracket 22 start to bend, being led by the curved sections 22e. Since the length L of the side walls is set sufficiently long and the curved sections 22e are formed between the front wall 22a and the side walls 22c, the bending action of the side walls 22c is smoothly performed without rupture of the energy absorption bracket 22.

As understood from the above desciption, since a sufficient amount of the applied impact load is absorbed by means of the plastic deformation of the energy absorption bracket without the rupture thereof, the expected energy absorption effect is stably attained. Further, since the energy absorption bracket is provided between the upper steering column and the vehicle body, it is easy to assemble the structure which is quite simple.

It is to be noted that throughout the specification, the expression "impact load applied in the direction along the axis of the steering column" includes not only "impact load which is directly applied in the direction along the axis of the steering column as the original force", but also "impact load applied in the direction along the axis of the steering column as a component of force" or "impact load applied in the direction along the axis of the steering column as a resultant force".

Figure 5:
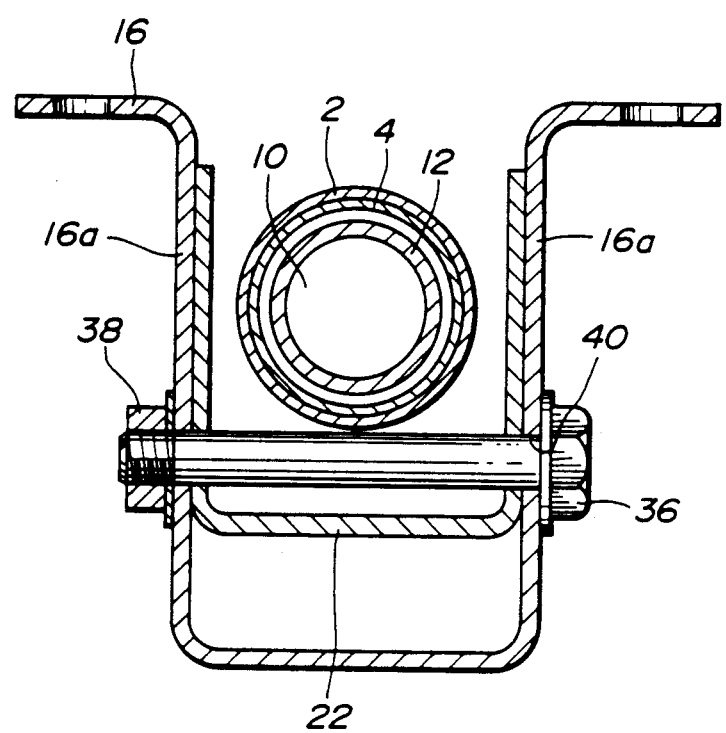
FIG. 5 is a sectional view showing a modification of the preferred embodiment shown in FIG. 2.

FIG. 5 shows a modification of the embodiment as described above. In this modification, the energy absorption mechanism is applied to a non-tilt-type steering column assembly. As seen from FIG. 5, the energy absorption bracket 22 is secured to the stationary bracket 16 by a fastening bolt 36 and a corresponding nut 38. The fastening bolt 36 is inserted through a pair of circular holes 40, 40 formed in the stationary bracket 16 and through a pair of the circular holes 22d, 22d. As this modification relates to the non-tilt-type steering column assembly, there is no tilt-angle adjusting mechanism as shown in FIG. 2.

It is clear that the energy absorption effect is fully attained also in this modification.

It is to be understood that the invention is not to be limited to the embodiments described above, and that various changes and modifications may be made without departing from the spirit and scope of the invention as defined in the appended claims.

What is claimed is:

1. A steering column assembly comprising:
   a steering column having an upper steering column tube and a lower steering column tube which are telescopically connected at their lower and upper portions respectively;
   a stationary bracket fixed to a vehicle body;
   an energy absorption bracket having a pair of side walls each extending along the axis of said steering column, a front wall arranged substantially perpendicular to said side walls, a pair of curved sections each having a predetermined radius of curvature and each connecting the corresponding side wall to said front wall;
   said energy absorption bracket being fixed to said stationary bracket and fixedly receiving said upper steering column tube for becoming plastically deformed in response to an impact load exceeding a predetermined value to allow said upper steering column tube to displace downwardly along the axis of said steering column with respect to said lower steering column tube, said impact load being applied to said energy absorption bracket through said upper steering column tube in a direction along the axis of said steering column;
   whereby the applied impact load is absorbed through said plastic deformation of the energy absorption bracket.

2. A steering column assembly as set forth in claim 1, wherein each side wall is generally of a key-shape having a first portion of a smaller width and a second portion of a larger width, said first portion being connected to the corresponding curved section at its end remote from said second portion and said second portion being connected to said stationary bracket.

3. A steering column assembly as set forth in claim 2, wherein said stationary bracket is generally of a U-shape in section and includes a pair of side walls each extending along the axis of said steering column, said energy absorption bracket being arranged between said stationary bracket side walls with each of said second portions facing the corresponding side wall of the stationary bracket, while each of said first portions projecting upward along the axis of the steering column from said stationary bracket, said upper steering column tube extending through said energy absorption bracket along the side walls of said energy absorption bracket and said stationary bracket and fixed to said front wall of the energy absorption bracket.

4. A steering column assembly as set forth in claim 3, wherein said second portion of each energy absorption bracket side wall is formed with a first through hole at its lower portion and each side wall of said stationary bracket is formed with a second through hole at its lower portion, said energy absorption bracket being fixed to said stationary bracket by means of a fastening bolt passsing through said first and second through holes.

5. A steering column assembly as set forth in claim 4, wherein a length of each side wall of said energy absorption bracket is not less than about 1.5 to 2.0 times of a width of said stationary bracket.

6. A steering column assembly as set forth in claim 5, wherein said plastic deformation of the energy absorption bracket is caused by a bending action of the side walls of the energy absorption bracket.

7. A steering column assembly comprising:
   a steering column having an upper steering column tube and a lower steering column tube which are telescopically connected at their lower and upper portions respectively;
   said steering column rotatably receiving an upper steering shaft and a lower steering sleeve which are telescopically connected at their lower and upper portions respectively;
   a stationary bracket fixed to a vehicle body;
   an energy absorption bracket having a pair of side walls each extending along the axis of said steering column, a front wall arranged substantially perpendicular to said side walls, a pair of curved sections each having a predetermined radius of curvature and each connecting the corresponding side wall to said front wall;
   said energy absorption bracket fixed to said stationary bracket and fixedly receiving said upper steering column tube which extends therethrough and being plastically deformed in response to an impact load exceeding a predetermined value to allow said upper steering column tube and said upper steering shaft to displace downwardly along the axis of said steering column with respect to said lower steering column tube and said lower steering sleeve respectively, said impact load being applied to said energy absorption bracket through said upper steering column tube in the direction along the axis of the steering column;
   whereby the applied impact load is absorbed through said plastic deformation of the energy absorption bracket.

8. A steering column assembly as set forth in claim 7, wherein each side wall is generally of a key-shape having a first portion of a smaller width and a second portion of a larger width, said first portion being connected to the corresponding curved section at its end remote from said second portion and said second portion being connected to said stationary bracket.

9. A steering column assembly as set forth in claim 8, wherein said stationary bracket is generally of a U-shape in section and includes a pair of side walls each extending along the axis of said steering column, said energy absorption bracket being arranged between said stationary bracket side walls with each of said second portions facing the corresponding side wall of the stationary bracket, while each of said first portions projecting upward along the axis of the steering column from said stationary bracket, said upper steering column tube extending through said energy absorption bracket along the side walls of said energy absorption bracket and said stationary bracket and fixed to said front wall of the energy absorption bracket.

10. A steering column assembly as set forth in claim 9, wherein said second portion of each energy absorption bracket side wall is formed with a first through hole at its lower portion and each side wall of said stationary bracket is formed with a second through hole at its lower portion, said energy absorption bracket being fixed to said stationary bracket by means of a fastening bolt passsing through said first and second through holes.

11. A steering column assembly as set forth in claim 12, wherein a length of each side wall of said energy absorption bracket is not less than about 1.5 to 2.0 times of a width of said stationary bracket.

12. A steering column assembly as set forth in claim 11, wherein said plastic deformation of the energy absorption bracket is caused by a bending action of the side walls of the energy absorption bracket.

* * * * *